United States Patent [19]

Schutten et al.

[11] Patent Number: 4,969,076
[45] Date of Patent: Nov. 6, 1990

[54] LOAD COMPENSATING GAIN CONTROL FOR A SERIES RESONANT INVERTER

[75] Inventors: Michael J. Schutten, Schenectady; John N. Park, Rexford, both of N.Y.; Ming H. Kuo, Fort Wayne, Ind.

[73] Assignee: General Electric Company, Schenectady, N.Y.

[21] Appl. No.: 393,187

[22] Filed: Aug. 14, 1989

[51] Int. Cl.$^5$ .................................. H02M 3/335
[52] U.S. Cl. ................................ 363/17; 363/98; 363/132
[58] Field of Search ............... 363/17, 41, 95, 97, 363/98, 132

[56] References Cited

U.S. PATENT DOCUMENTS

| | | | |
|---|---|---|---|
| 4,504,895 | 3/1985 | Steigerwald | 363/17 |
| 4,541,041 | 9/1985 | Park et al. | 363/41 |
| 4,670,832 | 6/1987 | Park | 363/17 |
| 4,694,383 | 9/1987 | Nguyen et al. | 363/98 |
| 4,855,888 | 8/1989 | Henze et al. | 363/98 |

*Primary Examiner*—Peter S. Wong
*Attorney, Agent, or Firm*—Jill M. Breedlove; James C. Davis, Jr.; Marvin Snyder

[57] ABSTRACT

A series resonant inverter is controlled to maintain a substantially constant gain and a substantially constant bandwidth, thereby ensuring stable operation under all operating conditions. A load compensating gain control circuit generates a unique gain or attenuation factor for each unique set of output load conditions. To maintain constant gain, inverter gain for each set of operating conditions is multiplied by the corresponding gain or attenuation factor. Bandwidth is increased (or decreased) and maintained constant to ensure stable operation.

7 Claims, 10 Drawing Sheets

LOAD COMPENSATING GAIN CONTROL FOR A SERIES RESONANT INVERTER

FIELD OF THE INVENTION

The present invention relates generally to resonant inverters. More particularly, this invention relates to a load compensating gain control for a series resonant inverter which maintains a substantially constant control system loop gain and a substantially constant bandwidth, thus ensuring stable operation over a wide range of output load conditions.

BACKGROUND OF THE INVENTION

Resonant inverters advantageously have low switching losses and low switching stresses. However, resonant operation is complex due to the fast dynamics of the high-frequency resonant tank circuit; and, hence, control is difficult. Disadvantageously, when input power or output load conditions vary, output voltage or current control may not be achieved through the use of usual control techniques. For example, one known resonant inverter output load voltage or current control method is to vary the frequency of the rectangular wave signal applied to the resonant circuit by the inverter via closed loop control. Commonly assigned U.S. Pat. No. 4,541,041, issued on Sept. 10, 1985 to J. N. Park and R. L. Steigerwald, which is hereby incorporated by reference, discloses in part such a frequency control technique. Briefly explained, the resonant nature of the circuit allows for control of output voltage or current through variation of the frequency at which the inverter's controllable switch means operate. Such a frequency control method has been found satisfactory under normal output load conditions for particular types of resonant inverters (i.e., heavy or medium load conditions for a series resonant inverter and light load conditions for a parallel resonant inverter). The drawback to frequency control, however, is that it may be inadequate to maintain a desired output voltage or current under extended output load conditions (i.e., light load or no load conditions for a series resonant inverter and heavy load conditions for a parallel resonant inverter).

In particular, frequency control of a series resonant inverter will normally be adequate to maintain a desired output voltage during heavy or medium load conditions (i.e., low resistance) because under these conditions, a series resonant circuit has a high quality factor Q and thus a good dynamic range of voltage or current change as frequency is varied. However, under extended or light output load conditions (i.e., high resistance), the series resonant circuit exhibits a low quality factor Q and thus a small dynamic range of voltage or current change as a function of frequency. As a result, for a series resonant inverter, it may be impossible to maintain a desired output voltage or current under light load and no load conditions solely with conventional frequency control.

Furthermore, a series resonant inverter typically provides a unique value of voltage gain for each unique set of output load conditions (i.e., output voltage and current). Conventional control strategies, such as the method of frequency control hereinabove described, ensure stability under high gain conditions (i.e., relatively high output current and relatively low output voltage) at the expense of system response under low gain conditions (i.e., relatively low output current and relatively high output voltage). Therefore, it is desirable to provide a resonant inverter control which maintains a substantially constant control system loop gain over a wide range of output load conditions.

OBJECTS OF THE INVENTION

Accordingly, it is an object of the present invention to provide a control for a series resonant inverter which results in an improved dynamic range of output voltage control.

Another object of the present invention is to provide a series resonant inverter control which maintains a substantially constant bandwidth to ensure stable operation over a wide range of output load conditions.

Still another object of the present invention is to provide a series resonant inverter control which compensates for changes in output load conditions to maintain a substantially constant control system loop gain.

SUMMARY OF THE INVENTION

The foregoing and other objects of the present invention are achieved in a new and improved series resonant inverter control which maintains a substantially constant bandwidth and a substantially constant control system loop gain under all load conditions. The new inverter control comprises a load compensating gain control circuit which generates a unique gain or attenuation factor (i.e., load compensation factor) for each unique set of load conditions. Inverter gain under the desired load conditions is multiplied by the gain or attenuation factor corresponding thereto. In this way, a substantially constant control system loop gain is maintained.

The preferred implementation of the load compensating gain control circuit comprises a control loop including a constant gain amplifier and a programmable multiplying digital-to-analog converter. The digital-to-analog converter is programmed to generate a unique gain or attenuation factor for each unique set of output load conditions.

Alternatively, the load compensating gain control circuit comprises an analog multiplier. For this implementation, output current and voltage are continuously monitored; and the analog multiplier, in conjunction with a gain computation circuit, calculates the corresponding load compensation factor therefrom.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION

Figure 1:
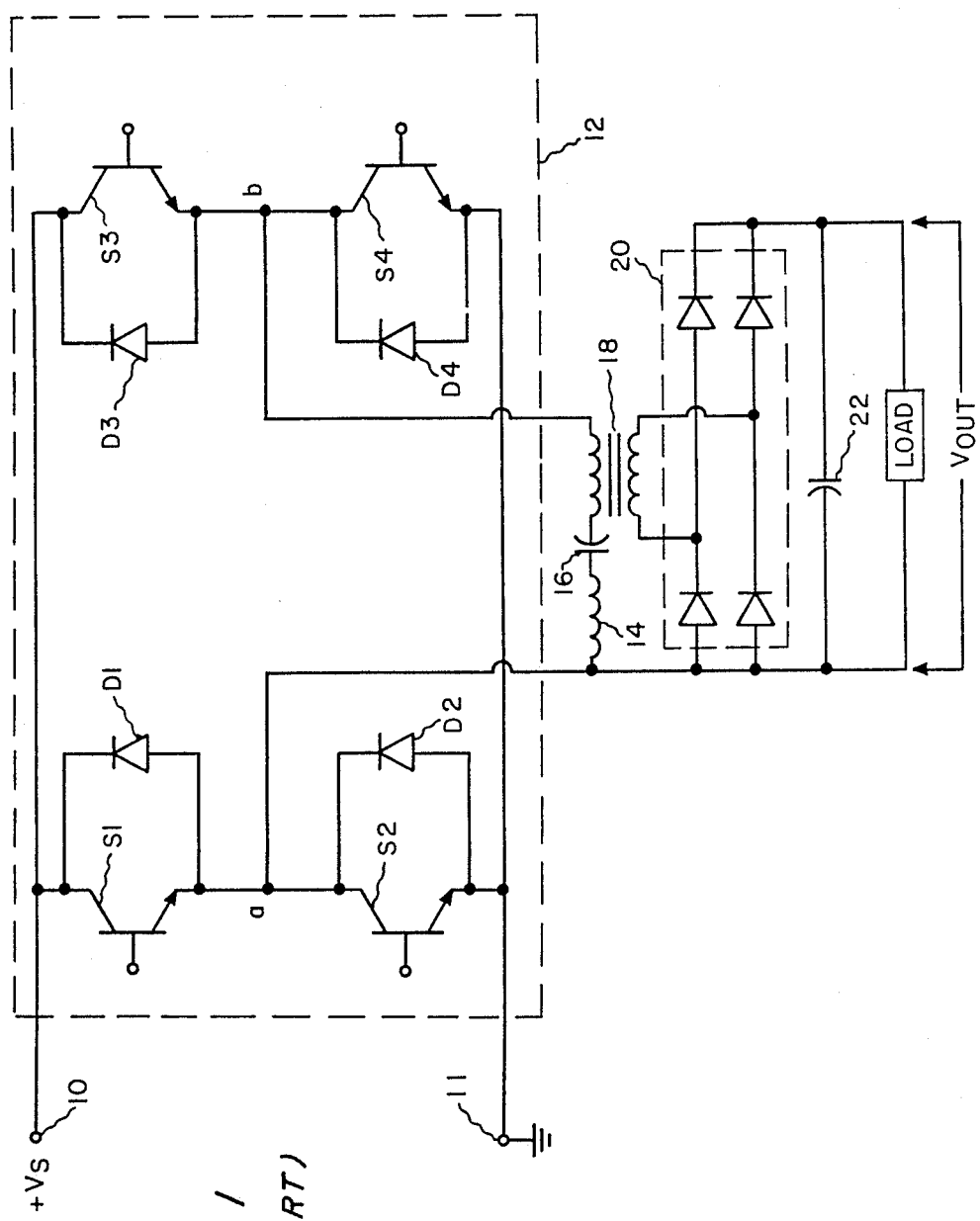
FIG. 1 is a schematic representation of a dc-to-dc converter including a series resonant inverter.

The improved resonant inverter control of the present invention will be described with reference to the dc-to-dc converter shown in FIG. 1. An external source (not shown) provides input dc voltage $V_s$ to the converter at terminals 10 and 11. Connected across terminals 10 and 11 is a full bridge inverter 12 having four switching devices that are capable of carrying reverse current and capable of being turned off by a switching signal. The switching devices are illustrated as bipolar junction transistors (BJTs) S1, S2, S3 and S4. Each respective switching device has a diode D1, D2, D3 and D4 connected in inverse parallel therewith, respectively. When the converter operates above the inverter resonant frequency, the switching devices are turned on at zero current, and the inverse parallel diodes are commutated naturally. Hence, these diodes need not be of the fast recovery type. Moreover, other switching devices with gate turn-off capability could be used instead of the BJTs, such as field effect transistors (FETs), each having an integral parasitic diode for carrying reverse current, or monolithic Darlington power transistors. It is further to be understood that the full bridge inverter is illustrated for purposes of description only and that the control technique of the present invention is not limited to use with such an inverter.

A series resonant tank circuit, comprising an inductor 14, a capacitor 16 and the primary winding of an isolation transformer 18, is connected between junctions a and b, which comprise the junctions between switching devices S1 and S2, and between switching devices S3 and S4, respectively. The secondary winding of transformer 18 is connected to the input of a full wave rectifier 20. The output of the rectifier is connected in parallel with a filter capacitor 22 and an output load (not shown) across which the converter output voltage $V_{OUT}$ is produced.

The voltage applied to the series resonant circuit is a rectangular wave signal having an amplitude switching between voltages $-V_s$ and $+V_s$. Conventional frequency control varies the operating frequency of this rectangular wave signal in order to maintain stable operation in the operable frequency range of the switching devices, the operable frequency range extending from the inverter resonant frequency to a maximum frequency beyond which the switching devices fail to operate satisfactorily. As will be appreciated by those of ordinary skill in the art, the series resonant circuit acts as a second order filter to the rectangular wave signal, thus determining the output voltage waveform.

Figure 2:
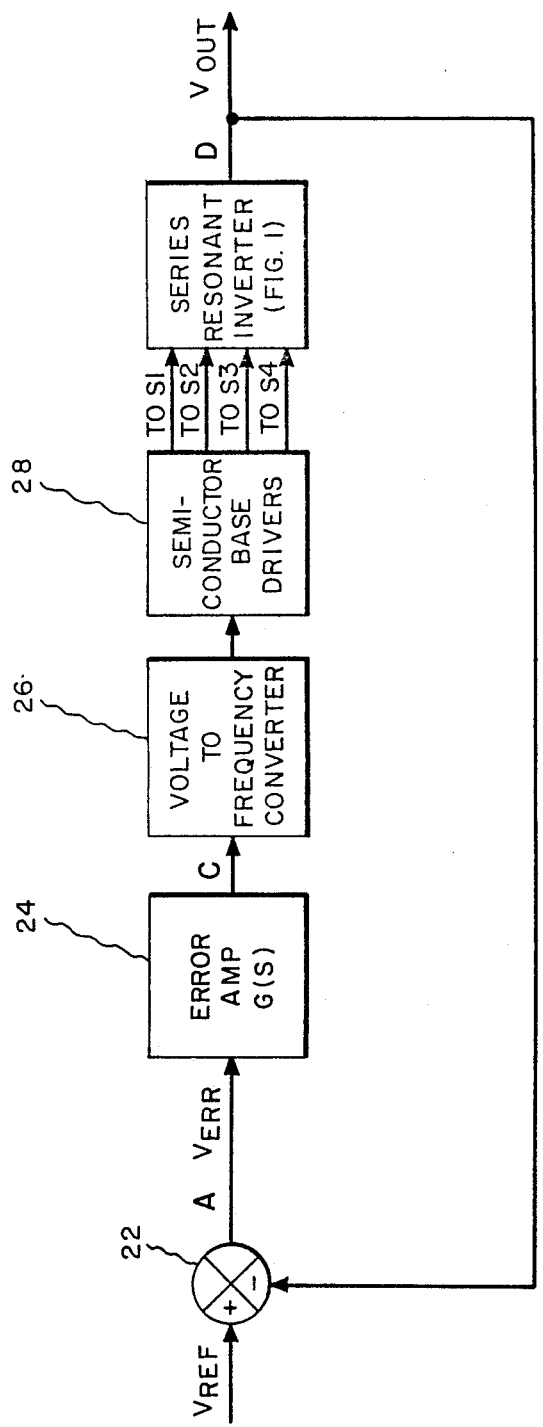
FIG. 2 is a simplified block diagram for a conventional control system for the series resonant inverter of FIG. 1.

FIG. 2 is a simplified block diagram of a conventional control loop for a series resonant inverter. A commanded output voltage $V_{REF}$ is compared to output voltage $V_{OUT}$ at point D by a summer 22. The resulting error signal $V_{ERR}$ at Point A is applied to an error amplifier 24. The preferred error amplifier is an integrator; however, a proportional plus integral compensator may be desirable, depending upon the particular application. The output signal from error amplifier 24 at point C is supplied to a voltage-to-frequency converter 26 for generating drive signals which are provided to semiconductor switches S1, S2, S3 and S4 via semiconductor base drivers 28. Any conventional base drivers may be employed, such as IR2110 bridge drivers manufactured by International Rectifier Company.

Figure 3:
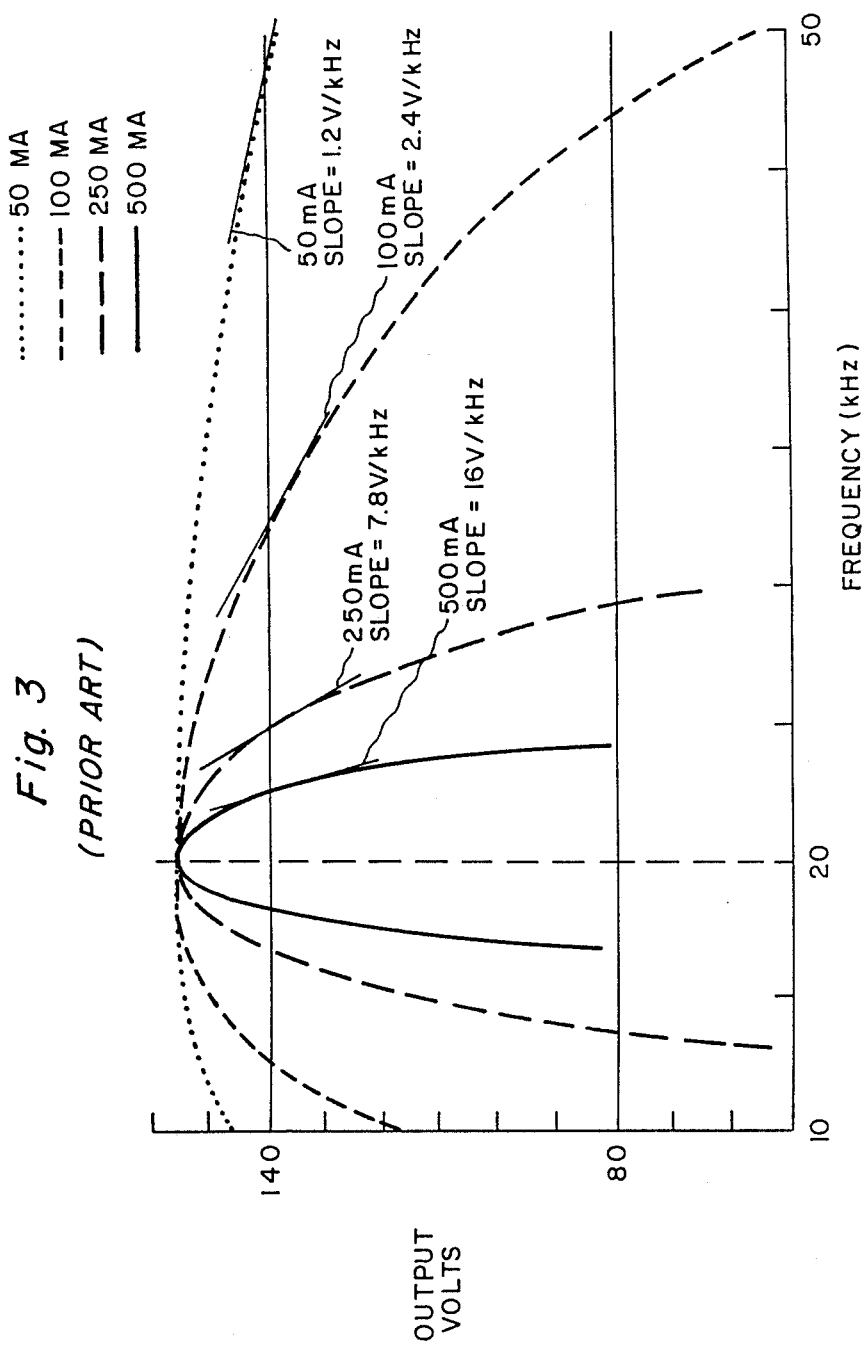
FIG. 3 graphically represents output voltage versus frequency for the series resonant inverter of FIG. 1, which is controlled by the system of FIG. 2, at specified output currents.

FIG. 3 is a graphical illustration of output voltage versus frequency for the series resonant inverter of FIG. 1 at different output currents. Specifically, these curves were generated for a series resonant inverter having an approximately 0.5 microfarad resonant capacitor and an approximately 126.7 microhenry resonant inductor. These circuit parameters yield an inverter resonant frequency of approximately 20 kilohertz (kHz). For each respective curve corresponding to a different output current, control system inverter loop gain $V_{OUT}/V_{ERR}$ was graphically obtained by calculating the slope at a fixed output voltage. The results are tabulated in Table I as follows:

TABLE I

| Output Current (mA) | Inverter Gain (V/kHz) at $V_{OUT}$ = 140 V |
|---|---|
| 50 | 1.2 |
| 100 | 2.4 |
| 250 | 7.8 |
| 500 | 16.0 |

For this particular resonant inverter, there is an approximately 1:13 variation in inverter gain in the range from 50 milliamps (mA) to 500 mA.

Figure 4:
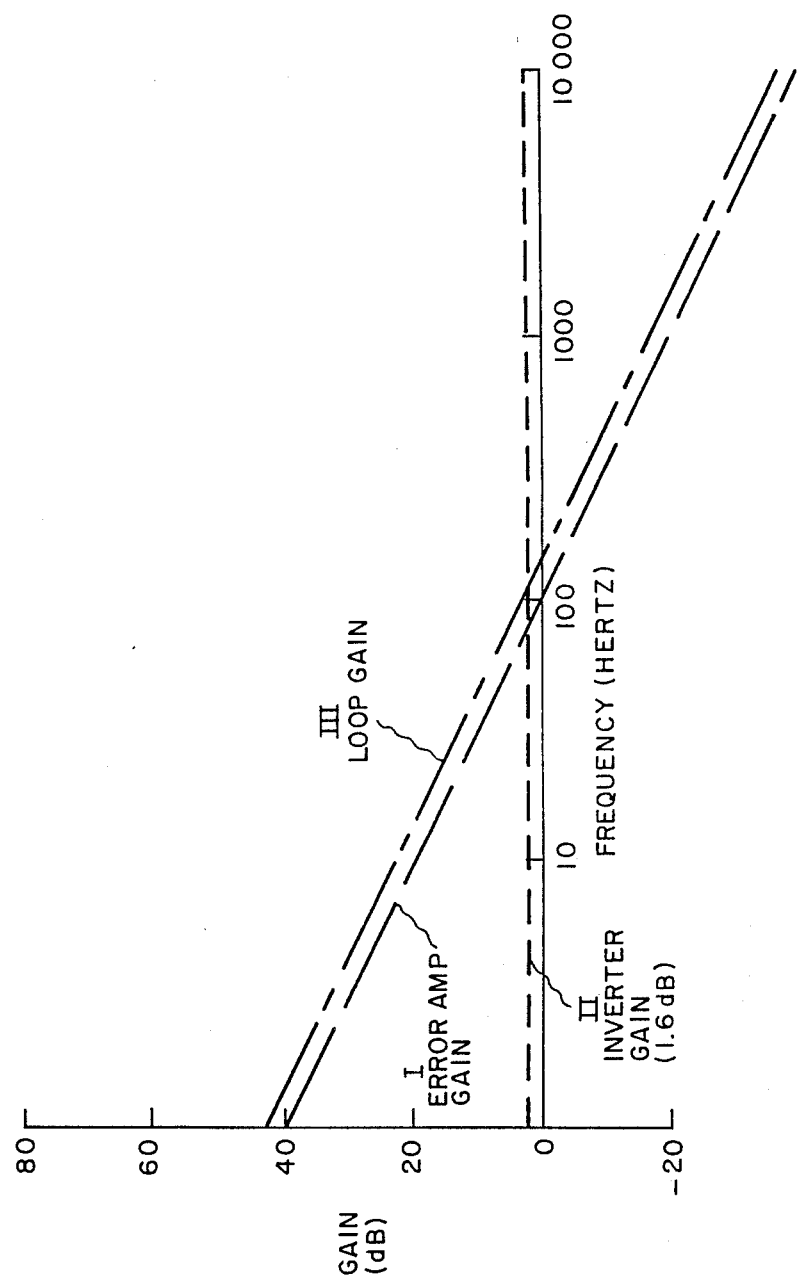
FIG. 4 is a graphical illustration including Bode plots for the system of FIG. 2 at output load conditions of 140 volts and 50 milliamps.
Figure 5:
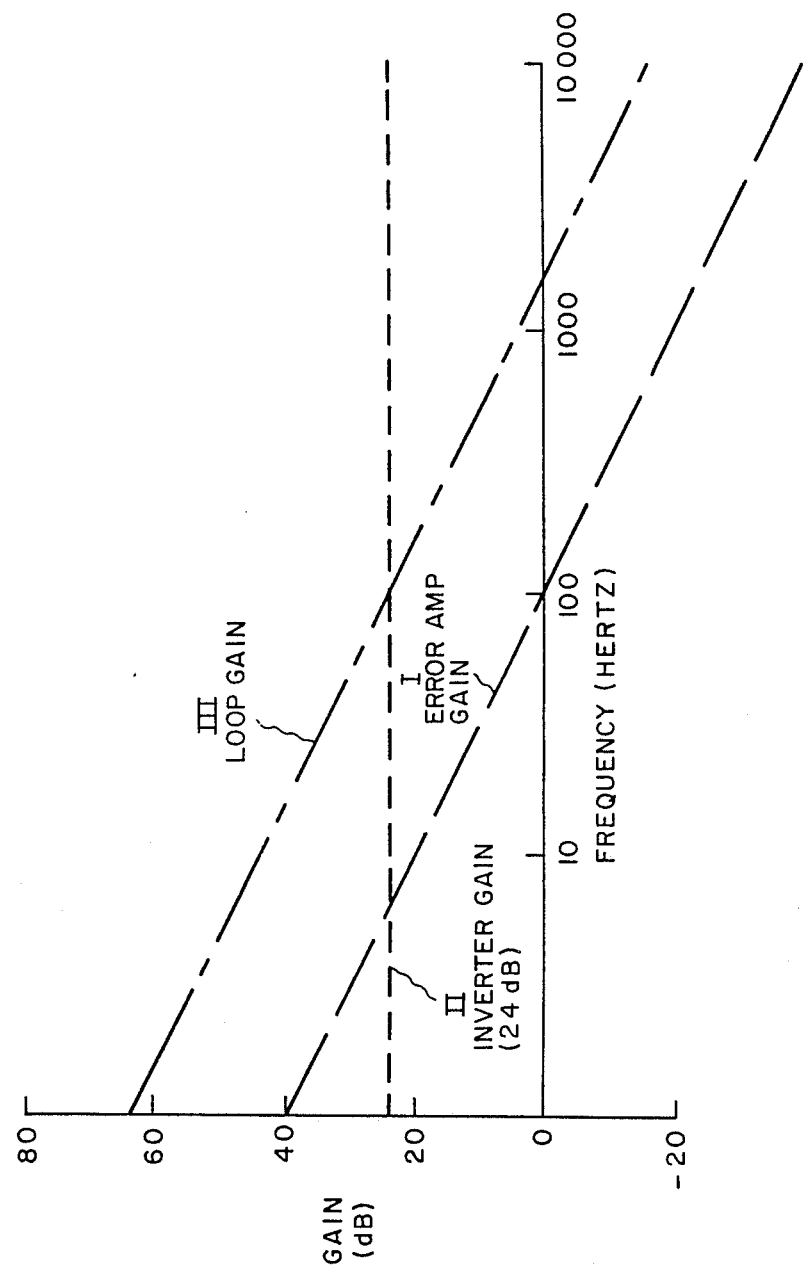
FIG. 5 is a graphical illustration including Bode plots for the system of FIG. 2 at output load conditions of 140 volts and 500 milliamps.

FIGS. 4 and 5 are Bode plots for the hereinabove described series resonant inverter at output currents of 50 mA and 500 mA, respectively, and at an output voltage $V_{OUT}$=140 volts (V). Frequency response and stability of the inverter system can be determined by analyzing these Bode plots. In particular, the critical point for stability is at −1 open-loop gain, i.e., 0 decibels (dB) gain and −180° phase shift. For each of FIGS. 4 and 5: Plot I represents the gain of error amplifier 24 from point A to point C in FIG. 2; Plot II represents the gain of the inverter between points C and D in FIG. 2; and Plot III represents the control system inverter loop gain $V_{OUT}/V_{ERR}$ between points A and D in FIG. 2.

As shown in FIG. 4, under output load conditions of 50 mA current and 140V, the inverter gain is 1.6 dB. Under these output conditions, the error amplifier crosses zero dB gain at 100 hertz (Hz) frequency, and the system loop gain crosses zero dB at about 150 Hz.

As shown in FIG. 5, at output load conditions of 500 mA current and 140V, the error amplifier zero-crossing remains the same, as shown in FIG. 4, but the zero-crossing of the system loop occurs at 2,200 Hz. The inverter gain under these output conditions is 24 dB. Hence, the bandwidth of the system under these output load conditions is more than 10 times greater than that of the system at 50 mA output current. Moreover, the system is stable, and the dynamic inverter system response is more than a factor of 10 times faster at 500 mA, 140V than at 50 mA, 140V.

From the foregoing analysis, it is clear that a unique value of inverter gain exists for each set of output load conditions. The new and improved resonant inverter control of the present invention, however, compensates for this effect to maintain a constant control system gain in addition to a substantially constant bandwidth under all output load conditions, while maintaining stable operation.

Figure 6:
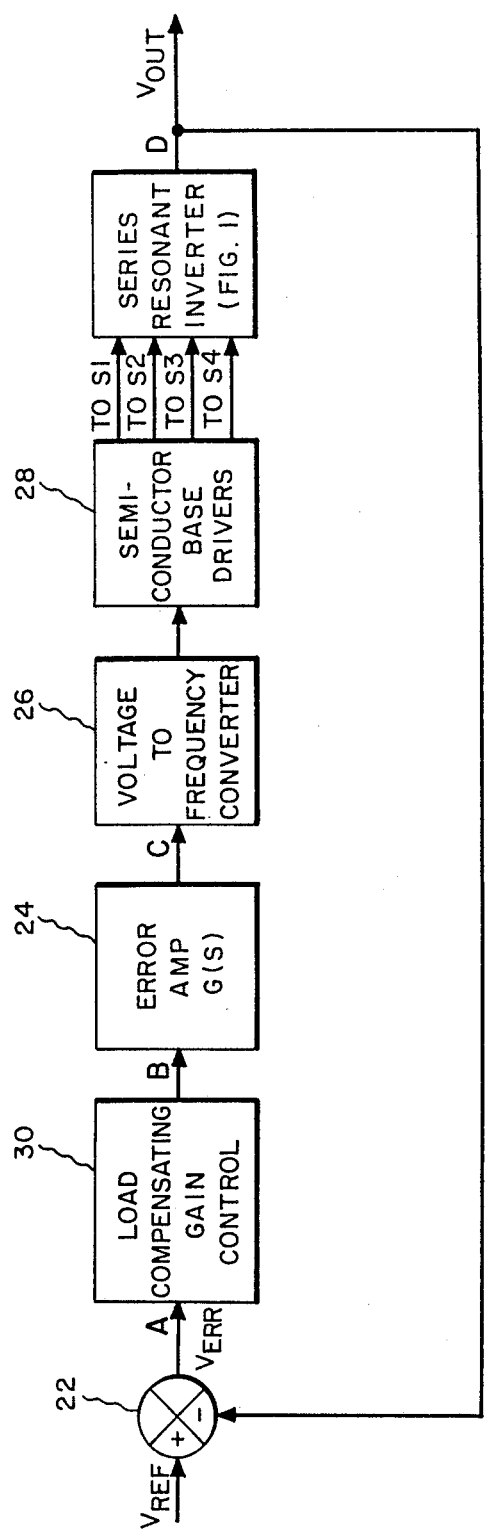
FIG. 6 is a simplified block diagram of a series resonant inverter control system according to the present invention.

FIG. 6 is a block diagram of the new inverter control of the present invention. The block diagram of FIG. 6 is similar to that of FIG. 2 with the addition of a load compensating gain control circuit 30. The load compensating gain control (LCGC) circuit receives the error signal $V_{ERR}$ from summer 22 and provides a unique gain (or attenuation) load compensation factor at point B for each unique set of output load conditions. In particular, load compensating gain control circuit 30 multiplies each hereinabove described unique inverter gain value by a unique gain (or attenuation) load compensation factor to maintain a substantially constant inverter loop gain over all output load conditions.

Figure 7:
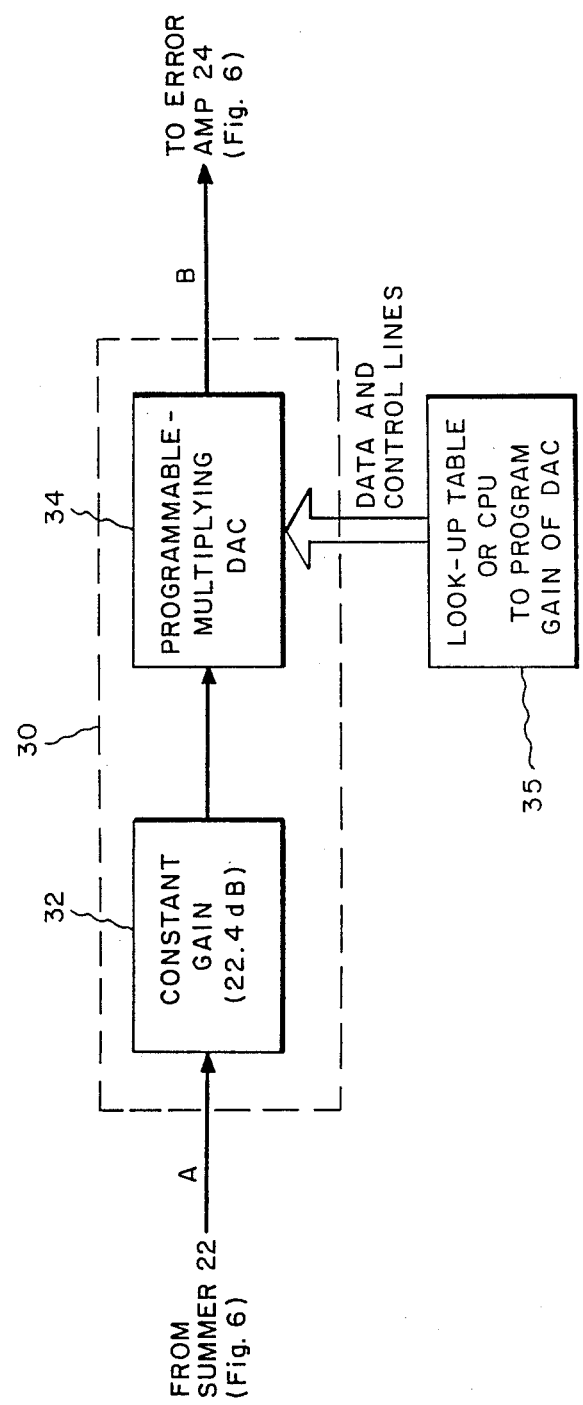
FIG. 7 is a simplified block diagram of a load compensating gain control circuit useful in the inverter control system of FIG. 6.

FIG. 7 illustrates the preferred implementation of load compensating gain control circuit 30. Error voltage $V_{ERR}$ is applied to a constant gain amplifier 32. The output signal from constant gain amplifier 32 is supplied to a variable gain circuit 34 which preferably comprises a programmable multiplying digital-to-analog converter (DAC). DAC 34 has a computer programmed gain which depends on existing and desired load conditions. In particular, DAC 34 is programmed using a gain look-up table or, alternatively, a central processing unit (CPU) 35, each gain value being programmed to correspond to a particular set of output load conditions. For example, for a constant gain amplifier 32 having a constant gain of 22.4 dB, the following data were tabulated in Table II for the hereinabove described resonant inverter in combination with the control system of the present invention.

TABLE II

| Output Current at $V_{OUT}$ = 140 V (mA) | Inverter Gain (V/KHz) | Inverter Gain (dB) | Load Compensating Gain Control Circuit Gain (dB) | Control System Loop Gain (dB) |
| --- | --- | --- | --- | --- |
| 50 | 1.2 | 1.6 | 22.4 | 24.0 |
| 100 | 2.4 | 7.6 | 16.4 | 24.0 |
| 250 | 7.8 | 17.8 | 6.2 | 24.0 |
| 500 | 16.0 | 24.0 | 0 | 24.0 |

As is evident from Table II, the unique inverter gain from points C to D of FIG. 6 remains the same as that of the conventional system for each output load condition. Moreover, load compensating circuit 30 has a unique gain, i.e. load compensation factor, for each output load condition. In each case, the inverter gain is multiplied by the corresponding load compensation factor determined by DAC 34. The result is a constant inverter loop gain of 24 dB for all output load conditions.

Figure 8:
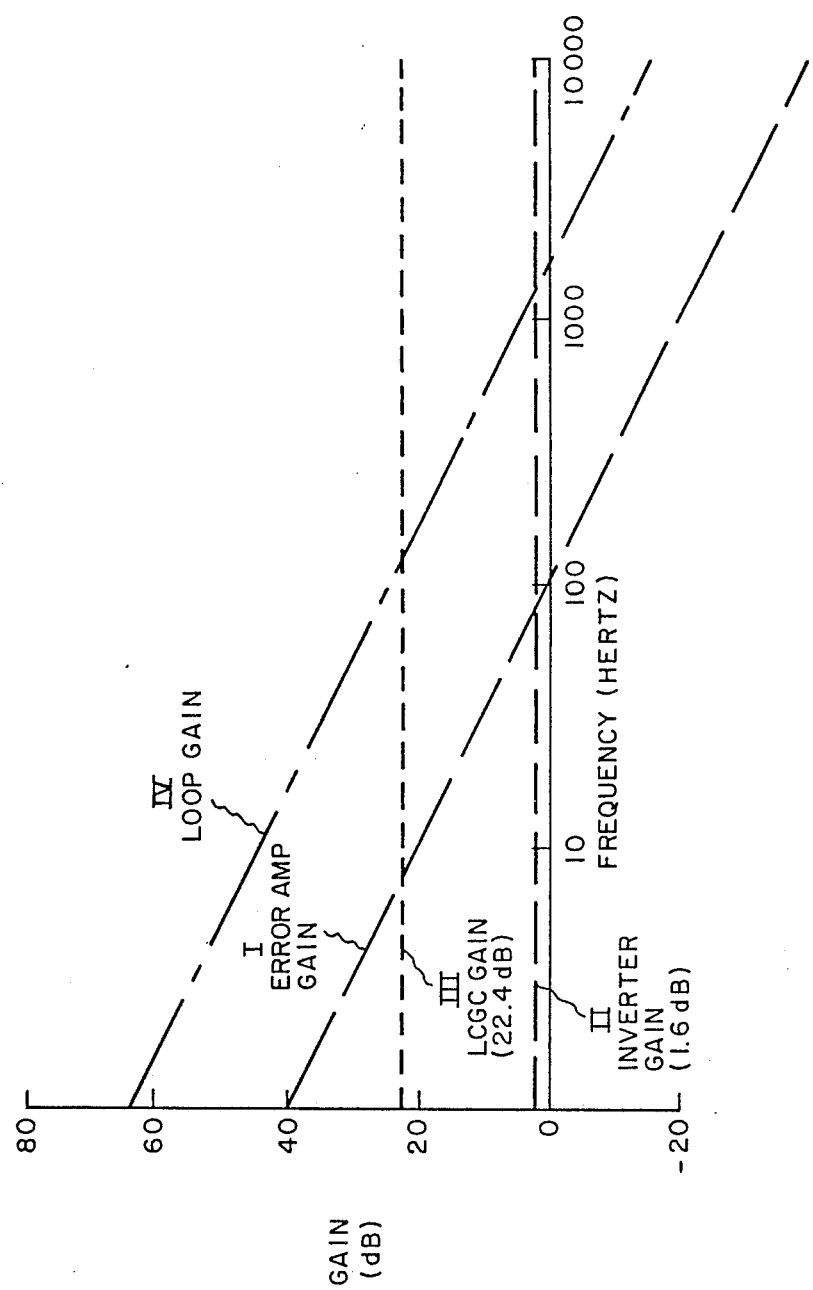
FIG. 8 is a graphical illustration including Bode plots for the system of FIG. 6 at output load conditions of 140 volts and 50 milliamps.
Figure 9:
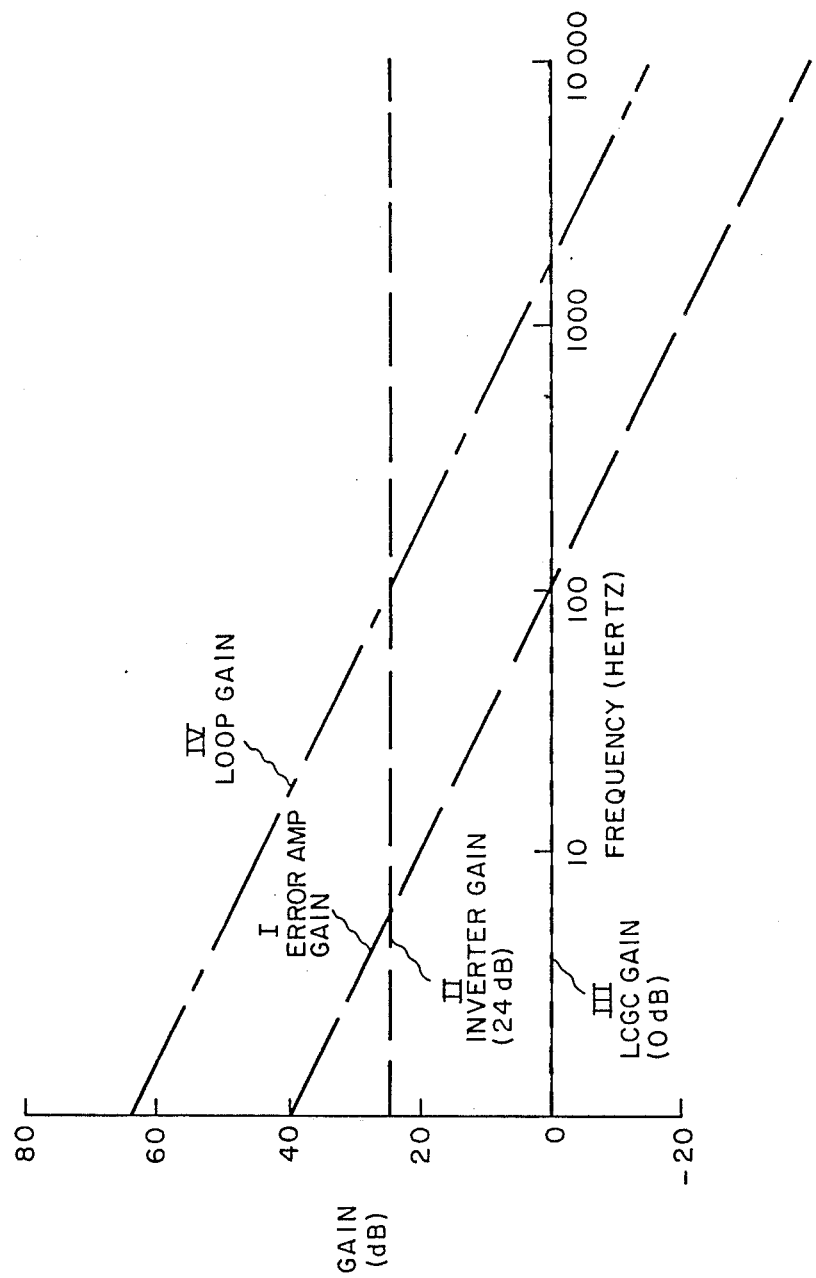
FIG. 9 is a graphical illustration including Bode plots for the system of FIG. 6 at output load conditions of 140 volts and 500 milliamps.

FIGS. 8 and 9 are Bode plots for the series resonant inverter system according to the present invention at output load conditions of 50 mA and 500 mA, respectively, and 140V. For each of FIGS. 8 and 9 and with reference to the block diagram of FIG. 6: Plot I represents the gain of error amplifier 24 between points B and C; Plot II represents the inverter gain between points C and D; Plot III represents the gain of load compensating gain control circuit 30 between points A and B; and Plot IV represents the control system loop gain between points A and D.

A comparison of FIGS. 8 and 9 reveals that the bandwidth of the inverter under both sets of operating conditions is the same. Moreover, the control system loop gain is identical for both sets of operating conditions and for all sets of operating conditions within the current range therebetween. As a result, the new inverter system approaches desired output voltage of 140V at the same rate for any value of output current.

Figure 10:
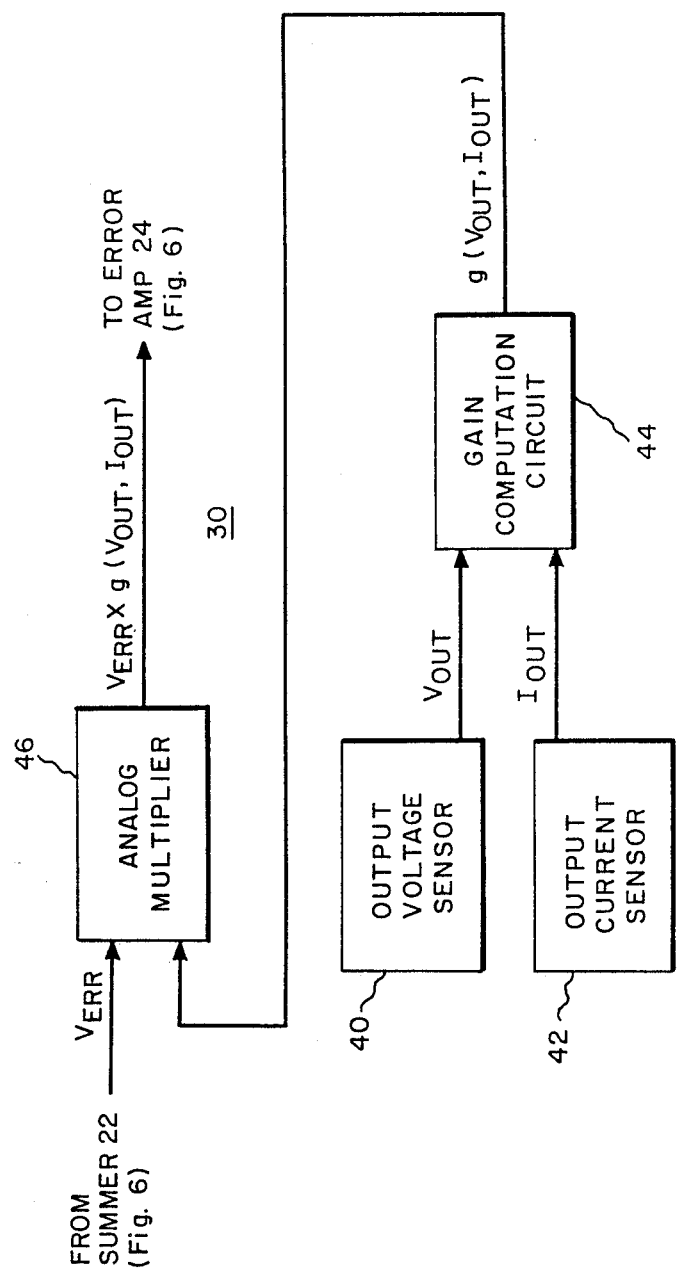
FIG. 10 is a simplified block diagram of an alternative embodiment of a load compensating gain control circuit useful in the inverter control system of FIG. 6.

FIG. 10 illustrates an alternative embodiment of load compensating gain control circuit 30. An output voltage sensor 40, such as a voltage-dividing network of resistors or any other well-known voltage sensor, continuously monitors output voltage $V_{OUT}$. An output current sensor 42, such as a Hall effect current sensor or any other well-known current sensor, continuously monitors output load current $I_{OUT}$. The instantaneous values of voltage $V_{OUT}$ and current $I_{OUT}$ are provided as input signals to a gain computation circuit 44 which calculates a gain value $g(V_{OUT}, I_{OUT})$ corresponding thereto. For the case described hereinabove with reference to Table II, for example, gain computation circuit 44 may be implemented to generate gain values $g(V_{OUT}, I_{OUT})$ using the data therein. Error voltage $V_{ERR}$ and gain value $g(V_{OUT}, I_{OUT})$ are applied to an analog multiplier 46 which generates the gain or attenuation factor by multiplying voltage $V_{ERR}$ and gain value $g(V_{OUT}, I_{OUT})$.

For an inverter having high-frequency poles due to, for example, secondary effects of parasitic capacitors and inductors, and which uses conventional control, may be stable at low output currents and unstable at high output currents. Hence, at high output currents, the system loop response may have a zero-crossing at a slope greater than 40 dB/decade which corresponds to a −180° phase shift. By using a load compensating circuit according to the present invention, a load compensation factor decreases the bandwidth, which is thereafter maintained constant, thus ensuring system stability under all operating conditions. In such a case, the load compensation factor comprises an attenuation factor.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. An improved dc-to-dc converter, comprising:
   a resonant inverter having two pairs of controllable switch means, the switch means of each pair being connected in series to define a respective junction therebetween and each pair of series-connected switch means being adapted to be connected in parallel across an external dc supply;

a series resonant circuit connected between the junctions of said controllable switch means and comprising a capacitor and an inductor, said inverter being adapted to apply a rectangular wave voltage to said series resonant circuit;

a full wave rectifier inductively coupled to said series resonant circuit, the output of said rectifier being adapted to supply a substantially constant preselected output voltage at a substantially constant output current to a load; and load compensating gain control means for maintaining a substantially constant inverter loop gain by multiplying a load compensation factor corresponding to said preselected output voltage and to said output current of said inverter with a voltage gain of said inverter.

2. The improved converter of claim 1 wherein said load compensating gain control means comprises a programmable digital-to-analog converter, said programmable digital-to-analog converter being responsive to means for programming said digital-to-analog converter to generate said variable compensation factor.

3. The improved converter of claim 2 wherein said programming means comprises a compensating gain look-up table including a separate respective gain value corresponding to each combination of said preselected output voltage and said output current.

4. The improved converter of claim 1 wherein said load compensating gain control means comprises:

voltage sensing means for continuously monitoring the instantaneous output load voltage;

current sensing means for continuously monitoring the instantaneous output load current; and analog computation means responsive to said voltage sensing means and to said current sensing means for calculating said load compensation factor corresponding to the instantaneous output load voltage and the instantaneous output load current.

5. A method for controlling a resonant inverter, said inverter having controllable switch means for producing a rectangular wave signal and applying said rectangular wave signal to a series resonant circuit, the output of said resonant inverter providing a substantially constant preselected output voltage and a substantially constant output current to a load, said method comprising the steps of:

determining the voltage gain of said inverter corresponding to said preselected output voltage and said output current;

multiplying the voltage gain of said inverter by a compensation factor corresponding to said preselected output voltage and to said output current in order to provide a substantially constant inverter loop gain.

6. The method of claim 5, further comprising:

providing a programmable digital-to-analog converter;

programming said digital-to-analog converter by a compensating gain loop-up table; and retrieving the respective value of said compensating gain corresponding to said preselected output load voltage and said output load current.

7. The method of claim 5, wherein the step of determining the voltage gain of said inverter corresponding to said preselected output voltage and said output current comprises:

continuously monitoring the instantaneous output load voltage and the instantaneous output load current; and calculating said voltage gain corresponding to the instantaneous output load voltage and the instantaneous output load current.

* * * * *